United States Patent
Xiang et al.

(10) Patent No.: US 10,937,166 B2
(45) Date of Patent: Mar. 2, 2021

(54) METHODS AND SYSTEMS FOR STRUCTURED TEXT DETECTION, AND NON-TRANSITORY COMPUTER-READABLE MEDIUM

(71) Applicant: BEIJING SENSETIME TECHNOLOGY DEVELOPMENT CO., LTD, Beijing (CN)

(72) Inventors: Donglai Xiang, Beijing (CN); Yan Xia, Beijing (CN)

(73) Assignee: BEIJING SENSETIME TECHNOLOGY DEVELOPMENT CO., LTD., Beijing (CN)

(*) Notice: Subject to any disclaimer, the term of this patent is extended or adjusted under 35 U.S.C. 154(b) by 247 days.

(21) Appl. No.: 16/052,584

(22) Filed: Aug. 1, 2018

(65) Prior Publication Data

US 2018/0342061 A1 Nov. 29, 2018

Related U.S. Application Data

(63) Continuation of application No. PCT/CN2017/092586, filed on Jul. 12, 2017.

(30) Foreign Application Priority Data

Jul. 15, 2016 (CN) .......................... 201610561355.7

(51) Int. Cl.
*G06F 40/279* (2020.01)
*G06K 9/00* (2006.01)
(Continued)

(52) U.S. Cl.
CPC .............. *G06T 7/11* (2017.01); *G06F 40/186* (2020.01); *G06F 40/279* (2020.01);
(Continued)

(58) Field of Classification Search
CPC ..... G06T 3/40; G06T 3/60; G06T 7/11; G06T 7/10; G06T 7/12; G06K 9/00442;
(Continued)

(56) References Cited

U.S. PATENT DOCUMENTS 5,521,985 A 5/1996 Camp, Jr.
10,262,235 B1* 4/2019 Chen ........................ G06N 3/08
(Continued)

FOREIGN PATENT DOCUMENTS

CN 103679901 A 3/2014
CN 103927352 A 7/2014
(Continued)

OTHER PUBLICATIONS

Shaoqing Ren, Kaiming He, Ross Girshick and Jian Sun, "Faster r-cnn: Towards real-time object detection with region proposal networks," In: Advances in Neural Information Processing Systems, (2015) 91-99.
(Continued)

Primary Examiner — Nirav G Patel
Assistant Examiner — Stephen M Brinich
(74) Attorney, Agent, or Firm — Syncoda LLC; Feng Ma

(57) ABSTRACT

A method for structured text detection includes: receiving, by a convolutional neural network, a to-be-detected image and at least one character region template, the to-be-detected image includes structured text, the at least one character region template includes locations of N first character regions with N being an integer equal to or greater than 1, and the location of each first character region is obtained based on locations of second character regions corresponding to the each first character region in M sample images that are of the same type as the to-be-detected image, where M is an integer equal to or greater than 1; and obtaining, by the convolutional neural network, an actual location of the
(Continued)

structured text in the to-be-detected image according to the at least one character region template. A system for structured detection and a non-transitory computer-readable medium are also provided.

19 Claims, 10 Drawing Sheets

(51) Int. Cl.
| | |
|---|---|
| *G06K 9/46* | (2006.01) |
| *G06K 9/62* | (2006.01) |
| *G06N 3/08* | (2006.01) |
| *G06T 7/11* | (2017.01) |
| *G06N 3/04* | (2006.01) |
| *G06F 40/186* | (2020.01) |
| *G06T 7/70* | (2017.01) |
| *G06N 5/04* | (2006.01) |
| *G06T 3/40* | (2006.01) |
| *G06T 3/60* | (2006.01) |

(52) U.S. Cl.
CPC ..... *G06K 9/00456* (2013.01); *G06K 9/00463* (2013.01); *G06K 9/4628* (2013.01); *G06K 9/6202* (2013.01); *G06K 9/627* (2013.01); *G06K 9/6273* (2013.01); *G06N 3/0454* (2013.01); *G06N 3/08* (2013.01); *G06N 5/046* (2013.01); *G06T 3/40* (2013.01); *G06T 3/60* (2013.01); *G06T 7/70* (2017.01)

(58) Field of Classification Search
CPC .......... G06K 9/00456; G06K 9/00409; G06K 9/00463; G06K 9/00469; G06K 9/6201; G06K 9/6202; G06N 3/0454; G06N 3/04454; G06N 3/04; G06N 5/046; G06N 5/047; G06F 40/186

USPC ................ 382/173, 175–180, 182–187, 229, 382/289–292, 135, 137

See application file for complete search history.

(56) References Cited

U.S. PATENT DOCUMENTS

| | | | |
|---|---|---|---|
| 2019/0069007 A1* | 2/2019 | Bodas | ............ H04N 21/440236 |
| 2019/0311210 A1* | 10/2019 | Chatterjee | ............ G06N 3/0445 |

FOREIGN PATENT DOCUMENTS

| | | |
|---|---|---|
| CN | 104182722 A | 12/2014 |
| CN | 104794504 A | 7/2015 |
| CN | 105469047 A | 4/2016 |
| CN | 105574513 A | 5/2016 |
| CN | 105608454 A | 5/2016 |
| CN | 106295629 A | 1/2017 |
| WO | WO-2018112900 A1 * | 6/2018 ........... G06K 9/6232 |

OTHER PUBLICATIONS

English translation of the Written Opinion of the International Search Authority in the international application No. PCT/CN2017/092586, dated Oct. 13, 2017.
International Search Report in international application No. PCT/CN2017/092586, dated Oct. 13, 2017.
Written Opinion of the International Search Authority in international application No. PCT/CN2017/092586, dated Oct. 13, 2017.
<Computer Knowledge and Technology>"Depth Learning Algorithm and Application based on Convolutional Neural Network", issued on May 5, 2015. vol. 11,No. 13.
English Translation of the Notification of the First Office Action of Chinese application No. 201610561355.7 , dated Sep. 5, 2017.

* cited by examiner

METHODS AND SYSTEMS FOR STRUCTURED TEXT DETECTION, AND NON-TRANSITORY COMPUTER-READABLE MEDIUM

CROSS-REFERENCE TO RELATED APPLICATIONS

This is a continuation of International Patent Application No. PCT/CN2017/092586 filed on Jul. 12, 2017, which claims priority to Chinese Patent Application No. 201610561355.7 filed on Jul. 15, 2016. The disclosures of these applications are hereby incorporated by reference in their entirety.

BACKGROUND

Structured text refers to the text having a substantially fixed layout structure, such as information of an ID card, a passport, a driving license, a receipt and the like. In the Digital Age, the information generally needs to be recorded into computers manually, consuming a lot of time. To save time, methods for capturing images of credentials and automatically obtaining texts from the images by using the computer vision technologies are started to be used.

SUMMARY

The present disclosure relates to the field of image processing, and in particular, to methods and systems for structured text detection, and a non-transitory computer-readable medium.

Embodiments of the present disclosure provide structured text detection solution. According to a first aspect of the embodiments of the present disclosure, there is provided a method for structured text detection provided, including: receiving, by a convolutional neural network, an image and at least one character region template, wherein the image comprises structured text, the at least one character region template comprises a location of at least one character region, and the location of each of the at least one character region is obtained based on a location of a character region corresponding to the each character region in at least one sample image that is of the same type as the image; and obtaining, by the convolutional neural network, actual locations of a group of to-be-detected regions in the image according to the at least one character region template.

According to a second aspect of the embodiments of the present disclosure, there is provided a system for structured text detection. The system includes a memory storing processor-executable instructions, and a processor arranged to execute the stored processor-executable instructions to perform steps of: receiving, by a corresponding to the each character region, an image and at least one character region template, wherein the image comprises structured text, the at least one character region template comprises a location of at least one character region, and the location of each of the at least one character region is obtained based on a location of a character region corresponding to the each character region in at least one sample image that is of the same type as the image; and obtaining, by the convolutional neural network, actual locations of a group of to-be-detected regions in the image according to the at least one character region template.

According to a third aspect of the embodiments of the present disclosure, there is provided a non-transitory computer-readable medium having stored thereon computer-readable instructions that, when executed by a processor, cause the processor to perform a method for structured text detection, the method including: receiving, by a convolutional neural network, an image and at least one character region template, wherein the image comprises structured text, the at least one character region template comprises a location of at least one character region, and the location of each of the at least one character region is obtained based on a location of a character region corresponding to the each character region in at least one sample image that is of the same type as the image; and obtaining, by the convolutional neural network, actual locations of a group of to-be-detected regions in the image according to the at least one character region template.

The following further describes in detail the technical solutions of the present disclosure with reference to the accompanying drawings and embodiments.

BRIEF DESCRIPTION OF THE DRAWINGS

According to the following detailed descriptions, this application can be understood more clearly with reference to the accompanying drawings.

Figure 1:
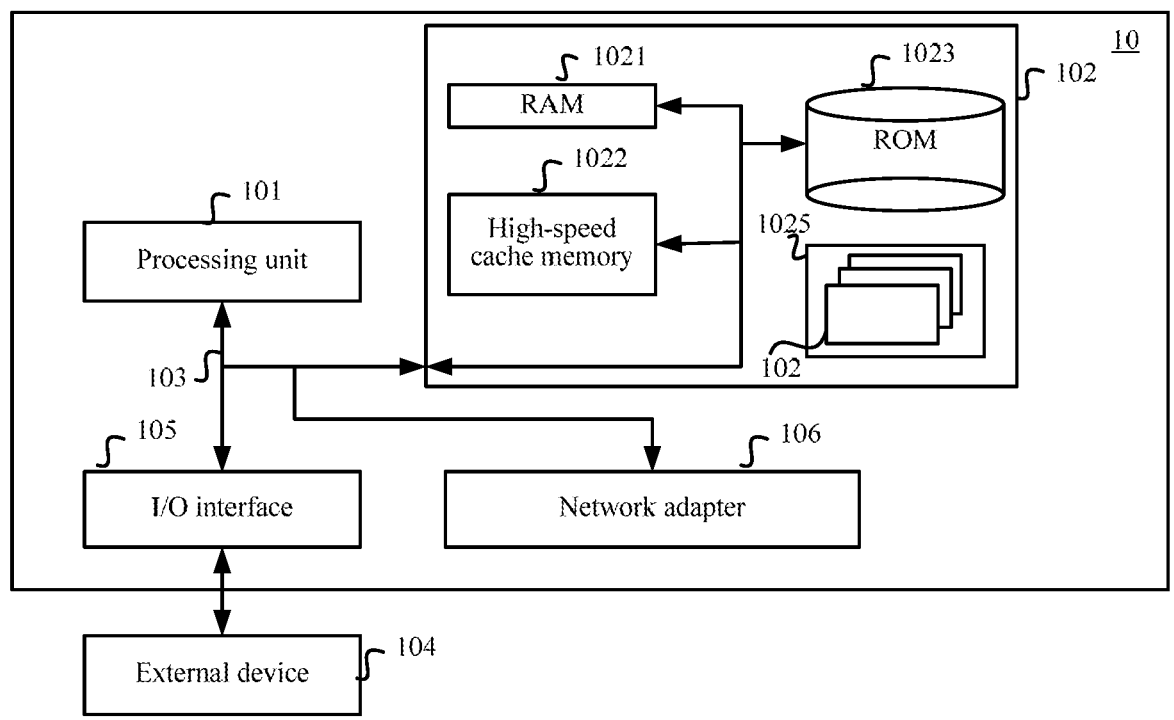
FIG. 1 is a block diagram of an exemplary device applicable to implementing the present disclosure.

For clarity, the accompanying drawings are schematic and simplified drawings and merely show the details necessary for understanding the present disclosure while other details are omitted.

DETAILED DESCRIPTION

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

In addition, it should be understood that, for ease of description, a size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in a subsequent accompanying drawing.

The technical solutions related to structured text detection in the embodiments of the present disclosure may be applied to a computer system/server, and may be operated together with numerous other general-purpose or special-purpose computing system environments or configurations. Examples of well-known computing systems, environments, and/or configurations suitable for use together with the computer system/server include, but are not limited to, a personal computer (PC) system, a server computer system, a thin client, a thick client, a handheld or laptop device, a microprocessor-based system, a set top box, a programmable consumer electronic product, a network PC, a minicomputer system, a mainframe computer system, distributed cloud computing environment that includes any one of the foregoing system and the like.

The computer system/server may be described in general context of computer system-executable instructions (for example, program modules) executed by a computer system. Generally, the program modules may include: a routine, a program, a target program, a component, logic, a data structure and the like for performing a specific task or implementing a specific abstract data type. The computer system/server may be implemented in distributed cloud computing environments in which a task is performed by remote processing devices linked via a communication network. In the distributed cloud computing environments, a program module may be located in a local or remote computing system storage medium including a storage device.

The technical solution related to structured text detection in the embodiments of the present disclosure, including the methods, systems and devices, may be implemented in many manners. For example, the methods, systems, and devices in the present disclosure may be implemented with software, hardware, firmware, or any combination of software, hardware, and firmware. The foregoing specific sequence of steps of the method is merely for description, and unless otherwise stated particularly, is not intended to limit the steps of the method in the present disclosure. In addition, in some embodiments, the present disclosure may alternatively be implemented as programs recorded in a recording medium. The programs include machine-readable instructions for implementing the methods according to the present disclosure. Therefore, the present disclosure further covers the recording medium storing the programs for performing the methods according to the present disclosure.

The following describes in detail the technical solutions of structured text detection in the embodiments of the present disclosure through specific embodiments with reference to the accompanying drawings.

FIG. 1 is a block diagram of an exemplary device 10 (for example, a computer system/server) applicable to implementing the present disclosure. The device 10 shown in FIG. 1 is merely an example, and is not intended to limit the functions and scope of use of the present disclosure. As shown in FIG. 1, the device 10 may be presented in a form of a general-purpose computing device. Components of the device 10 may include, but are not limited to, one or more processors or processing units 101, a system memory 102, and a bus 103 connecting different system components (including the system memory 102 and the processing unit 101). The device 10 may include various computer system-readable media. These media may be any usable medium accessible by the device 10, including volatile media or non-volatile media, removable media or non-removable media, or the like.

The system memory 102 may include a computer system-readable medium that is in a form of a volatile memory, such as a random access memory (RAM) 1021 and/or a high-speed cache memory 1022. The device 10 may further include other removable/non-removable and volatile/non-volatile computer system storage media. For example, a read-only memory (ROM) 1023 may be configured to read/write a non-removable and non-volatile magnetic medium (not shown in FIG. 1 and generally referred to as a "hard disk drive"). Though not shown in FIG. 1, a hard disk drive configured to read/write a removable and non-volatile disk (for example, a "floppy disk") and an optical disk drive configured to read/write a removable and non-volatile optical disk (for example, a compact disc read-only memory (CD-ROM), a dissociated vertical deviation read-only memory (DVD-ROM), or another optical medium) may be provided. In these cases, each drive may be connected to the bus 103 through one or more data medium interfaces. The system memory 102 may include at least one program product. The program product has a group of (for example, at least one) program modules. These program modules are configured to implement the functions of the present disclosure.

A program/utility 1025 having the group of (at least one) program modules 1024 may be stored in, for example, the system memory 102. Such a program module 1024 includes, but is not limited to, an operating system, one or more application programs, other program modules, and program data. Each of these examples or a combination of these examples may include an implementation of a network environment. The program modules 1024 generally perform the functions and/or the methods described in the present disclosure.

The device 10 may further communicate with one or more external devices 104 (such as a keyboard, a pointing device, a display and the like). Such communication may be performed through an input/output (I/O) interface 105. In addition, the device 10 may further communicate with one or more networks (for example, a local area network (LAN), a wide area network (WAN), and/or a public network such as the Internet) through a network adapter 106. As shown in FIG. 1, the network adapter 106 communicates with another module (for example, the processing unit 101) in the device 10 via the bus 103. It should be understood that, though not shown in FIG. 1, other hardware and/or software modules may be used in conjunction with the device 10.

The processing unit 101 (i.e., the processor) performs various functional applications and data processing by running the computer program stored in system memory 102. For example, the processing unit 101 executes instructions for implementing each step of the method for structured text detection according to any one of the embodiments of the present disclosure. Specifically, the processing unit 101 may execute the computer program stored in the system memory 102, and when the computer program is executed, the following steps are implemented: receiving, by a convolutional neural network, an image and at least one character region template, where the image includes structured text, the at least one character region template includes a location of at least one character region, and the location of each of the at least one character region is obtained based on a location of a corresponding character region in at least one sample image that is of the same type as the image; and obtaining, by the convolutional neural network, actual locations of a group of to-be-detected regions in the image according to the at least one character region template.

Figure 2:
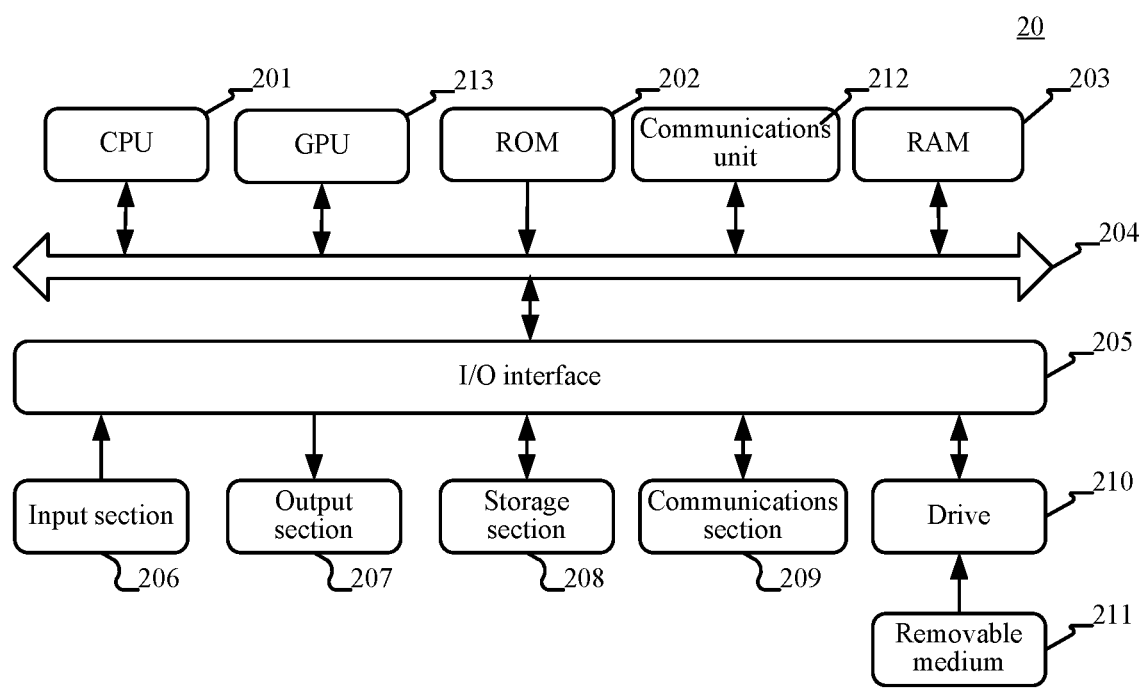
FIG. 2 is a schematic structural diagram of an exemplary device applicable to implementing the present disclosure.

FIG. 2 is a schematic structural diagram of an exemplary device 20 suitable for implementing the present disclosure. The device 20 may be a mobile terminal, a PC, a tablet computer, a server, or the like. In FIG. 2, the computer system 20 includes one or more processors, a communication part and the like. The one or more processors may be: one or more central processing units (CPU) 201, and/or one or more graphics processing units (GPU) 213 and the like. The processor may perform various proper actions and processing according to executable instructions stored in an ROM 202 or executable instructions loaded from a storage section 208 to an RAM 203. The communication part 212 may include, but is not limited to, a network card. The network card may include, but is not limited to, an Infiniband (IB) network card. The processor may communicate with the ROM 202 and/or the RAM 203, to execute executable instructions. The processor is connected to the communication part 212 via a bus 204, and communicates with other target devices via the communication part 212, thereby implementing corresponding steps of the method according to any one of the embodiments of the present disclosure. In an example of the present disclosure, steps performed by the processor include: receiving, by a convolutional neural network, an image and an character region template, where the image includes structured text, the character region template includes a location of at least one character region, and the location of each of the at least one character region is obtained based on a location of a corresponding character region in at least one sample image that is of the same type as the image; and obtaining, by the convolutional neural network, actual locations of a group of to-be-detected regions in the image according to the character region template.

In addition, the RAM 203 may further store various programs and data required during an operation of the apparatus. The CPU 201, the ROM 202, and the RAM 203 are connected to each other via the bus 204. In the presence of the RAM 203, the ROM 202 is an optional module. The RAM 203 stores executable instructions, or writes executable instructions to the ROM 202 during running. The executable instructions cause the CPU 201 to perform the steps of the method according to any one of the embodiments of the present disclosure. An I/O interface 205 is also connected to the bus 204. The communication unit 212 may be integrated, or may be set as having a plurality of sub-modules (for example, a plurality of IB network cards) respectively connected to the bus.

The following components are connected to the I/O interface 205: an input section 206 including a keyboard, a mouse and the like; an output section 207 including a cathode-ray tube (CRT), a liquid crystal display (LCD), a speaker and the like; the storage section 208 including a hard disk and the like; and a communication section 209 of a network interface card including an LAN card, a modem and the like. The communication section 209 performs communication processing through a network such as the Internet. A drive 210 is also connected to the I/O interface 205 according to requirements. A removable medium 211 such as a magnetic disk, an optical disk, a magneto-optical disk, a semiconductor memory or the like is mounted on the drive 210 according to requirements, so that a computer program read from the removable medium 211 may be installed on the storage section 208 according to requirements.

It should be noted that, the architecture shown in FIG. 2 is merely an optional implementation. During specific practice, a number and types of the components in FIG. 2 may be selected, decreased, increased, or replaced according to actual requirements. Different functional components may be separated or integrated or the like. For example, the GPU and the CPU may be separated. For another example, the GPU may be integrated on the CPU, and the communication unit may be separated from or integrated on the CPU or the GPU or the like. These alternative implementations all fall within the protection scope of the present disclosure.

Particularly, a process described below with reference to a flowchart according to an implementation of the present disclosure may be implemented as a computer software program. For example, an implementation of the present disclosure includes a computer program product. The computer program product includes a computer program tangibly included in a machine-readable medium. The computer program includes program code for performing steps shown in the flowchart. The program code may include instructions for performing each corresponding step of the method according to any one of the embodiments of the present disclosure, for example, an instruction for receiving, by a convolutional neural network, an image and at least one character region template, where the image includes structured text, the at least one character region template includes a location of at least one character region, and the location of each of the at least one character region is obtained based on a location of a corresponding character region in at least one sample image that is of the same type as the image; and an instruction for obtaining, by the convolutional neural network, actual locations of a group of to-be-detected regions in the image according to the at least one character region template.

In such implementation, the computer program may be downloaded and installed from a network through the communication section 209 and/or installed from the removable medium 211. The computer program, when being executed by the CPU 201, executes the foregoing instructions described in the present disclosure.

Figure 3:
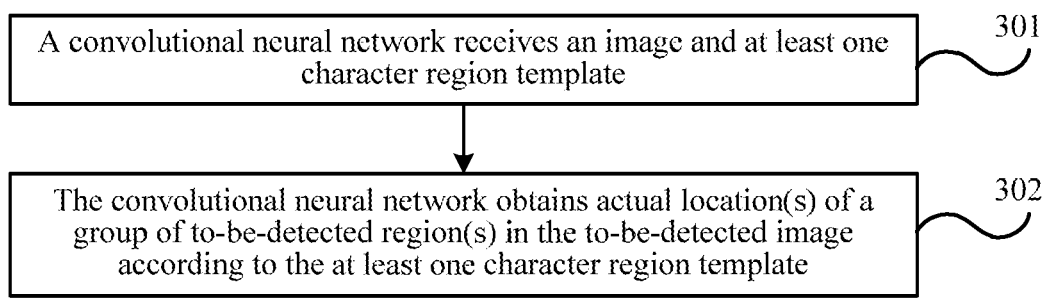
FIG. 3 is a flowchart of a method for structured text detection according to an embodiment of the present disclosure.

FIG. 3 is a flowchart of a method for a method for structured text detection according to an embodiment of the present disclosure. As shown in FIG. 3, the method for structured text detection according to this embodiment includes the following operations.

In 301, a convolutional neural network receives an image and at least one character region template.

The image includes structured text, and is an image on which structured text detection needs to be performed. For ease of distinguishing, the image may be referred to as a to-be-detected image in the embodiments of the present disclosure. The at least one character region template includes a location of at least one character region, and the location of each of the at least one character region is obtained based on a location of a character region corresponding to the each character region in at least one sample image that is of the same type as the to-be-detected image.

In an optional implementation, the location of each character region in the at least one character region template, for example, may be determined by a central coordinate, a width, and a length of a corresponding character region, or may be determined by coordinate of the top margin, bottom margin, right margin and left margin of the corresponding character region.

In an optional implementation, the operation 301 may be performed by a processor by invoking an instruction stored in a memory, or may be performed by a receiving module 601 run by the processor.

In 302, the convolutional neural network obtains actual locations of a group of to-be-detected regions in the to-be-detected image according to the at least one character region template.

In an optional implementation, the operation 302 may be performed by a processor by invoking an instruction stored in a memory, or may be performed by an obtaining module 602 run by the processor.

In the method for structured text detection according to the embodiments of the present disclosure, the at least one character region template is pre-obtained based on locations of corresponding character regions in the at least one sample image that is of the same type as the image, and after receiving the to-be-detected image and the at least one character region template, the convolutional neural network obtains the actual locations of the group of to-be-detected regions in the to-be-detected image according to the at least one character region template. In this way, there is a relatively small number of to-be-detected regions, the computing amount required for structured text detection is decreased, less time is consumed, a detection rate is apparently faster, and computing resources required are reduced apparently.

Figure 4:
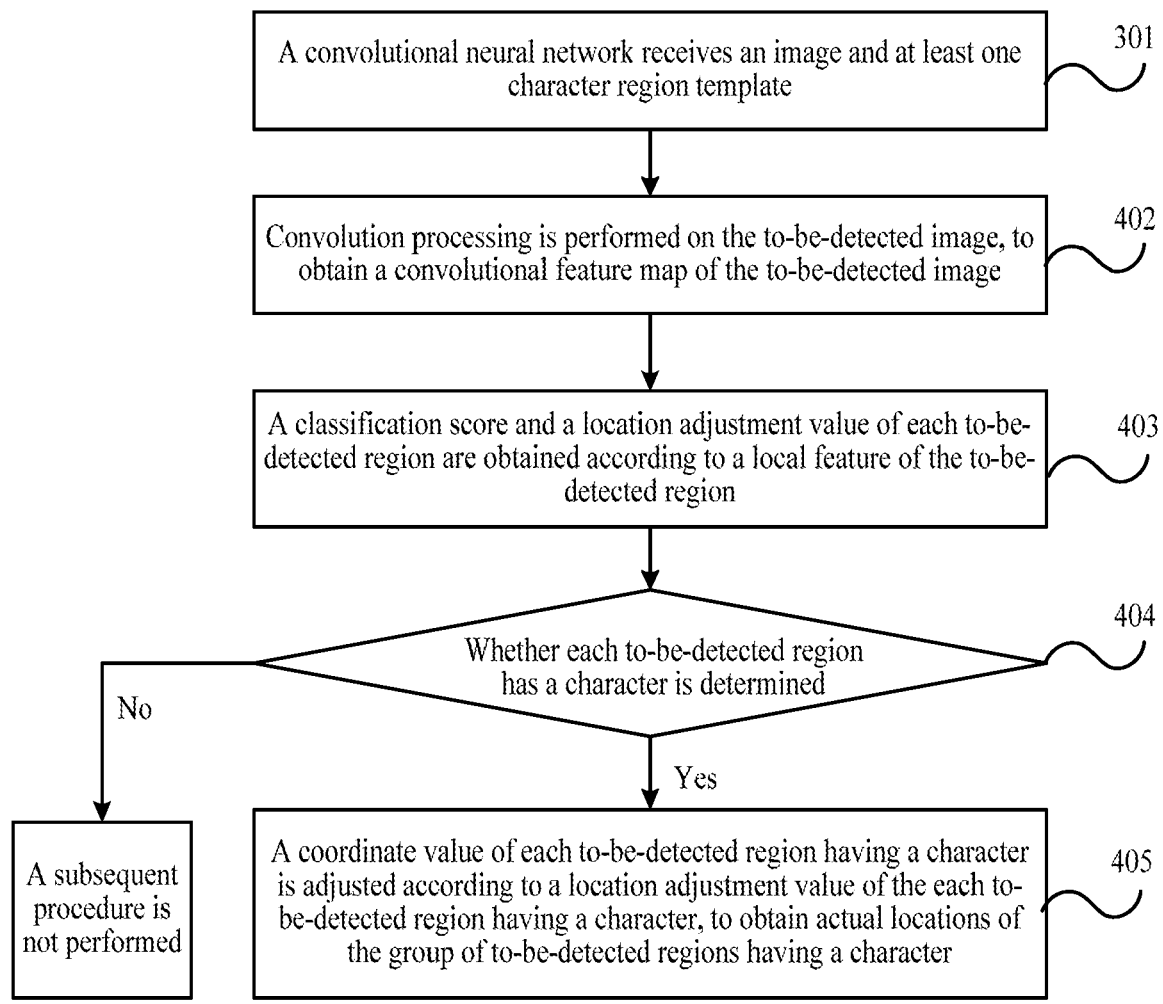
FIG. 4 is a flowchart of a method for structured text detection according to another embodiment of the present disclosure.

FIG. 4 is a flowchart of a method for a method for structured text detection according to another embodiment of the present disclosure. As shown in FIG. 4, compared with the embodiment shown in FIG. 3, in this embodiment, step 302 may be implemented exemplarily by using the following solution.

In 401, convolution processing is performed on the to-be-detected image, to obtain a convolutional feature map of the to-be-detected image.

The convolutional feature map is a feature map formed by all features extracted from the to-be-detected image.

In an optional implementation, the operation 401 may be performed by a processor by invoking an instruction stored in a memory, or may be performed by a feature extraction unit 701 run by the processor.

In 402, a Region of Interest (RoI) Pooling operation is performed on the convolutional feature map by taking location(s) of all character region(s) in the at least one character region template as the group of to-be-detected region(s) in the to-be-detected image, and a local feature of each to-be-detected region in the group of to-be-detected region(s) is extracted.

In an optional implementation, the operation 402 may be performed by a processor by invoking an instruction stored in a memory, or may be performed by an RoI Pooling operation unit 702 run by the processor.

In 403, a classification score and a location adjustment value of each to-be-detected region are obtained according to the local feature of each to-be-detected region.

In an optional implementation, the operation 403 may be performed by a processor by invoking an instruction stored in a memory, or may be performed by a classification score and location adjustment value obtaining unit 703 run by the processor.

In 404, whether each to-be-detected region in the group of to-be-detected region(s) has a character is determined according to the classification score of the each to-be-detected region.

In an optional example, in the operation 404, the classification score of each to-be-detected region may be determined by using a classification function (such as softmax) layer in the convolutional neural network; and in a case that the classification score of a to-be-detected region is greater than a preset threshold, it is determined that the to-be-detected region whose classification score is greater than the preset threshold has a character. Otherwise, in a case that the classification score of the to-be-detected region is not greater than the preset threshold, it is determined that the to-be-detected region whose classification score is not greater than the preset threshold has no character.

Operation 405 is performed on the to-be-detected region having a character. A subsequent procedure in this embodiment is not performed on the to-be-detected region having no character.

In an optional implementation, the operation 404 may be performed by a processor by invoking an instruction stored in a memory, or may be performed by a character region determining unit 704 run by the processor.

In 405, a coordinate value of each to-be-detected region having a character is adjusted according to the location adjustment value of the each to-be-detected region having a character, to obtain actual location(s) of the group of to-be-detected region(s) having a character.

In an optional implementation, the actual location of each to-be-detected region may be expressed as: $[x+w*f1, y+h*f2, \exp(f3)*w, \exp(f4)*h]$.

$(x+w*f1, y+h*f2)$ represents a central coordinate $(X, Y)$ of a to-be-detected region having a character, $\exp(f3)*w$ represents a length of the to-be-detected region, and $\exp(f4)*h$ represents a width of the to-be-detected region; x, y, h, and w respectively represent X coordinate, Y coordinate, width, and length of the center of a character region corresponding to a to-be-detected region having a character; [f1, f2, f3, f4] respectively represent a regression objective of each character region in the at least one character region template during training of the convolutional neural network, where $[f1, f2, f3, f4] = [(x'-x)/w, (y'-y)/h, \log(w'/w), \log(h'/h)]$, and x', y', h', and w' respectively represent X coordinate, Y coordinate, width, and length of the center of a corresponding character region in each of the at least one sample image.

In an optional implementation, the operation 405 may be performed by a processor by invoking an instruction stored in a memory, or may be performed by an actual location determining unit 705 run by the processor.

In addition, still referring to FIG. 4, in another optional embodiment of the method for structured text detection according to the present disclosure, before the operation 301, the to-be-detected image may be pre-processed, including: clipping the image, rotating the image to be upright, and scaling the image to a preset size. That is, in the embodiments of the present disclosure, the image received by the convolutional neural network is a pre-processed image. A background region in the image may be removed by the clipping, and the slanting image may become upright by the rotating. In an optional implementation, the pre-processing operation may be performed by a processor by invoking an instruction stored in a memory, or may be performed by an image pre-processing module 603 run by the processor.

In addition, still referring to FIG. 4, in still another optional embodiment of the method for structured text detection according to the present disclosure, after the operation 302 or 405, character recognition is performed on regions corresponding to the actual location(s) of the group of to-be-detected region(s), to obtain structured text information in the to-be-detected image. In an optional implementation, the pre-processing operation may be performed by a processor by invoking an instruction stored in a memory, or may be performed by a character recognition module 604 run by the processor.

In addition, in yet another optional embodiment of the method for structured text detection according to the present disclosure, before the operation 301, the at least one character region template corresponds to the to-be-detected image may be obtained. For example, in an optional implementation solution, the at least one character region template may be obtained in the following manner:

obtaining correct location(s) of all character region(s) in the at least one sample image that is of the same type as the to-be-detected image separately; and obtaining at least one average value of correct location(s) of corresponding character region(s) in the at least one sample image for each kind of character region in the at least one sample image, and obtaining the at least one character region template according to the at least one average value of the correct location(s) of all the character region(s) in the at least one sample image. That is, the at least one character region template includes the average value(s) of the correct location(s) of all the character region(s) in the at least one sample image.

In an optional implementation, the operation of obtaining the character region template that corresponds to the to-be-detected image may be performed by a processor by invoking an instruction stored in a memory, or may be performed by at least one character region template module 605 or a calculation module 607 run by the processor.

In the present disclosure, the at least one character region template is used as the to-be-detected region (Proposal) of the image, thereby improving a speed of the structured text detection. For acquisition of the structured text information, after the pre-processing is performed on the image, such as clipping the image, rotating the image to be upright, scaling the image to a preset size and the like, due to errors caused by the clipping and rotating to be upright and because a length of structured text per se varies a little bit in different images, locations of to-be-detected regions in different images may be different. However, the to-be-detected regions are distributed surrounding a center in a form of more in the middle and less around. Average values of respective locations of all character regions in a large number of structured text images that are of the same type are pre-calculated and used as a group of character region templates. Then, the character region templates are used as the to-be-detected regions and input to the convolutional neural network, where the RoI Pooling operation is performed to extract the local feature of each to-be-detected region. Then, the classification score and the location adjustment value of a corresponding to-be-detected region are calculated according to the local feature, to determine whether there is text in this region and to determine a location of the text. In this way, the number of the to-be-detected regions is equal to the total number of text regions that possibly exist, thereby reducing the amount of calculation during structured text recognition and improving recognition speed.

Figure 5:
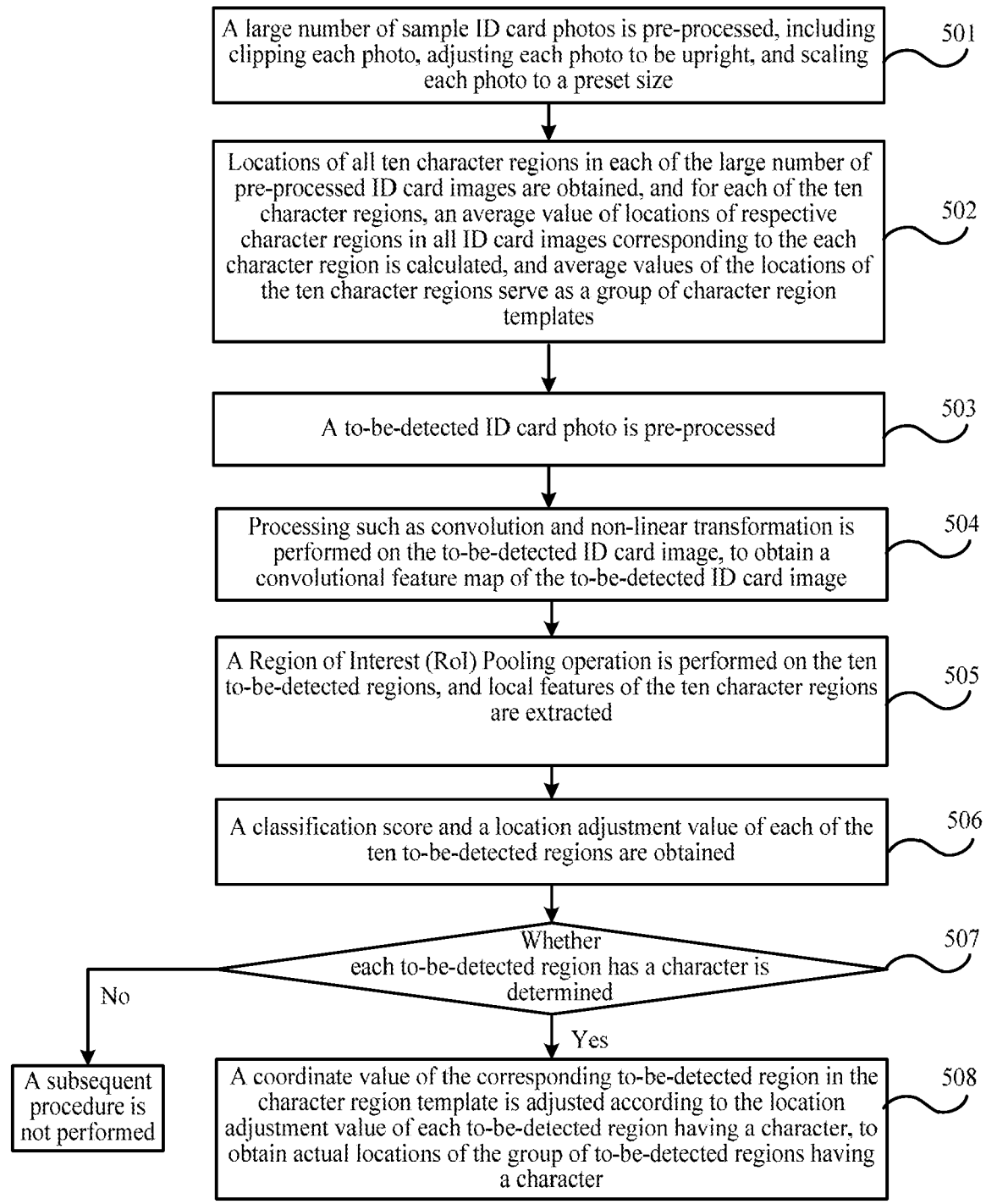
FIG. 5 is a flowchart of a method for structured text detection according to an application embodiment of the present disclosure.
Figure 6:
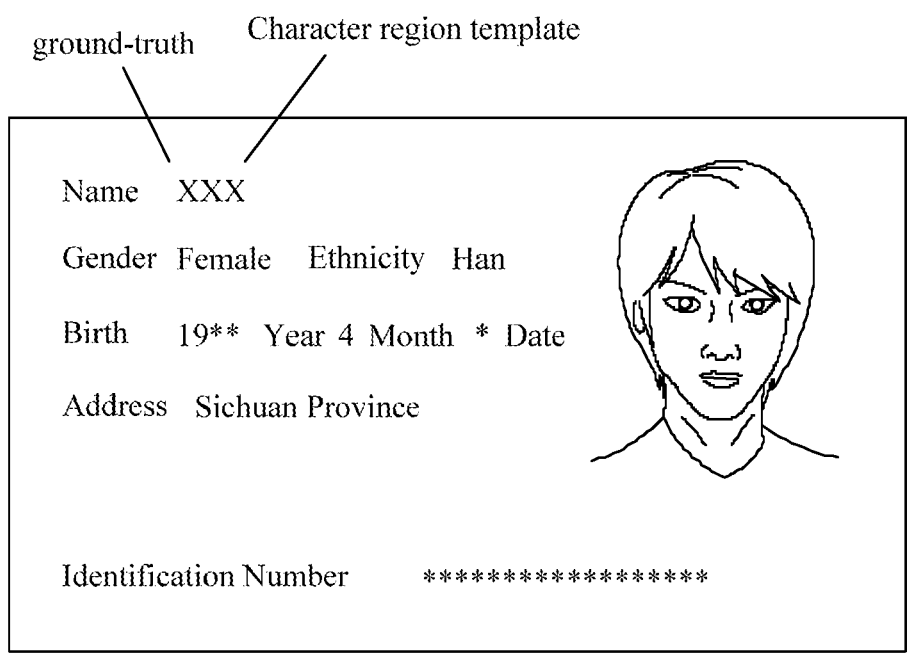
FIG. 6 is a schematic diagram of an image used in the application embodiment shown in FIG. 5.

FIG. 5 is a schematic diagram of the a method for structured text detection according to an application embodiment of the present disclosure. FIG. 6 is a schematic diagram of an image used in the application embodiment shown in FIG. 5. As shown in FIG. 3, in the application embodiment, the embodiments of the present disclosure are described by taking an ID card photo as the to-be-detected image as an example. It may be understood that, in addition to the structured text detection of the ID card, the technical solution provided in the present disclosure may further be applied to other kinds of structured text detection, such as structured text detection of a passport, a driving license, a receipt or the like, and details are not described herein.

As shown in FIG. 6, an ID card photo includes ten regions (i.e., character regions) that possibly have character information, where "address" occupies three rows at most. Each row forms a character region. A correct location of each character region is referred to as a ground-truth block and is determined by the X coordinate of each of the right and left margins and the Y coordinate of each of the top and bottom margins. As shown in FIG. 5, the present disclosure embodiment includes the following operations.

In 501, a large number of sample ID card photos are pre-processed, including clipping the photos and rotating the photos to be upright. A background region in an ID card photo is removed by the clipping, and a slanting ID card photo becomes upright by rotating. Then, the ID card photo is scaled to a preset size, to obtain an ID card image.

In 502, locations of all of the ten character regions in each of the large number of pre-processed ID card images are obtained, and for each of the ten character regions, an average value of locations of respective character regions in all ID card images corresponding to the each character region is calculated. Average values of the locations of the ten character region are used as a group of character region templates and served as a detection basis of the character regions in a to-be-detected ID card image (to-be-detected regions in the embodiments of the present disclosure), as shown in a "template" in FIG. 6.

The operations 501 and 502 are operations pre-performed before the method for structured text detection is performed on the to-be-detected image. After the character region templates are obtained through the operations 501 and 502, when structured text detection is directly performed on the to-be-detected image by using the method for structured text detection in the present disclosure, the following operations 503 to 508 are performed directly, and the operations 501 and 502 do not need to be performed.

In 503, the to-be-detected ID card photo is pre-processed, including: clipping the to-be-detected ID card photo, rotating the to-be-detected ID card photo to be upright, and scaling the to-be-detected ID card photo to a preset size, so as to obtain a to-be-detected ID card image, and the to-be-detected ID card image and the character region templates obtained through the operations 501 and 502 are input to a convolutional neural network.

In 504, processing, such as convolution, non-linear transformation and/or the like, is performed on the to-be-detected ID card image, to obtain a convolutional feature map of the to-be-detected ID card image.

In 505, a region of interest pooling operation is performed by using the locations of the ten character regions in the character region templates obtained by means of the operations 501 and 502 as a group of to-be-detected regions in the to-be-detected ID card image, i.e., ten to-be-detected regions in total, and local features of the ten character regions are extracted.

In 506, a classification score and a location adjustment value of each of the ten to-be-detected regions are obtained, for example, by using one or more fully-connected (Fc) layers in the convolutional neural network.

In 507, whether each to-be-detected region has a character is determined, for example, by using a classification function (such as softmax) layer in the convolutional neural network. The classification score of each to-be-detected region is determined, for example, it is to be 0.5; and if the classification score of a to-be-detected region is greater than a preset threshold, it is determined that the to-be-detected region whose classification score is greater than the preset threshold has a character; and otherwise, if the classification score of a to-be-detected region is not greater than the preset threshold, it is determined that the to-be-detected region whose classification score is not greater than the preset threshold has no character.

The preset threshold may be set and adjusted according to an actual situation.

Operation 508 is performed on each to-be-detected region having a character. The to-be-detected region having no character is abandoned and subsequent procedure in this embodiment is not performed on the to-be-detected region having no character.

In 508, according to the location adjustment value of each to-be-detected region having a character, a coordinate value of the corresponding to-be-detected region in the character region template is adjusted, so as to obtain actual locations of a group of to-be-detected regions having a character.

Specifically, the actual location of each to-be-detected region may be expressed as: $[x+w*f1, y+h*f2, \exp(f3)*w, \exp(f4)*h]$.

$(x+w*f1, y+h*f2)$ is the X and Y coordinate of the center of the corresponding to-be-detected region, $\exp(f3)*w$ is a length of the corresponding to-be-detected region, $\exp(f4)*h$ is a width of the corresponding to-be-detected region, and $\exp(\ )$ is an exponential function.

After the actual location of the to-be-detected region is determined, characters in the corresponding region may be automatically recognized by using various character recognition technologies.

Further, before the foregoing embodiments of the method for structured text detection in the present disclosure, the method may further include: training the convolutional neural network by using the at least one sample image that is of the same type as the to-be-detected image, where the sample image includes at least one character region, and the sample image is tagged with a correct location of each of the at least one character region. After the training is completed, the structured text detection may be performed on the image by using the convolutional neural network and the foregoing embodiments of the present disclosure.

In an optional implementation, the training the convolutional neural network by using the at least one sample image that is of the same type as the image includes:

receiving, by the convolutional neural network, the at least one sample image and the at least one character region template; performing the following operations on any one of the at least one sample image: performing convolution processing on an sample image, to obtain a convolutional feature map of the sample image; performing an RoI Pooling operation on the convolutional feature map by using locations of all character regions in the at least one character region template as a group of to-be-detected regions in the sample image, and extracting a local feature of each to-be-detected region in the group of to-be-detected regions; obtaining a prediction classification score and a location adjustment value of each to-be-detected region in the group of to-be-detected regions; determining, according to the prediction classification score of the to-be-detected region, whether each to-be-detected region has a character; and adjusting, according to a location adjustment value of each to-be-detected region having a character, a coordinate value of the each to-be-detected region having a character, to obtain a predicted location of the each to-be-detected region having a character. Exemplarily, the predicted location of a to-be-detected region may be expressed as $[x+w*f1, y+h*f2, \exp(f3)*w, \exp(f4)*h]$, where $(x+w*f1, y+h*f2)$ is the X coordinate and Y coordinate of the center of the to-be-detected region, $\exp(f3)*w$ is a length of the to-be-detected region, $\exp(f4)*h$ is a width of the to-be-detected region, and $\exp(\ )$ is an exponential function.

The convolutional neural network is trained according to the correct location of each character region that is tagged in the at least one sample image, a determining result indicating whether each to-be-detected region has a character, and the predicted location, to adjust values of network parameters in the convolutional neural network.

In the embodiment of the present disclosure in which the convolutional neural network is trained, the operations performed by the convolutional neural network on the sample image are the same as the operations performed by the convolutional neural network on the to-be-detected image in the embodiment of the foregoing method for structured text detection, and this method can be considered as a method for structured text detection in which the sample image serves as the to-be-detected image. Therefore, for an optional implementation of the embodiment in which the convolutional neural network is trained, refer to the corresponding implementations in the embodiment of the foregoing method for structured text detection, and details are not described herein again.

In an optional implementation, when the convolutional neural network is trained according to the correct location of each character region that is tagged in the at least one sample image, the determining result indicating whether each to-be-detected region has a character, and the predicted location, an iterative update method or a gradient update method may be used.

When the convolutional neural network is trained by using the iterative update method, the process of training the convolutional neural network by using the at least one sample image that is of the same type as the image may be performed iteratively. In each performing process, for example, a first loss function value may be calculated by using a softmax loss function and according to the correct location of each character region that is tagged in the at least one sample image and the determining result indicating whether each to-be-detected region has a character, and a second loss function value may be calculated by using a smooth L1 loss regression function and according to the correct location of each character region that is tagged in the at least one sample image and the predicted location. A regression objective of the regression function of each to-be-detected region may be, for example, $[f1, f2, f3, f4] = [(x'-x)/w, (y'-y)/h, \log(w'/w), \log(h'/h)]$, where $x'$, $y'$, $h'$, and $w'$ are respectively X coordinate, Y coordinate, width, and length of a corresponding ground-truth block of each sample image; $x$, $y$, $h$, and $w$ are respectively X coordinate, Y coordinate, width, and length of a corresponding to-be-detected region. Alternatively, the number of times of training performed on the convolutional neural network may be counted. The values of the network parameters in the convolutional neural network are adjusted according to the first loss function value and/or the second loss function value, so that the first loss function value and/or the second loss function value is reduced. Then, a next-time training process is performed, until a preset condition is satisfied. For example, the training is ended when the number of times of training performed on the convolutional neural network reaches a preset threshold or when each of the first loss function value and/or the second loss function value is less than a corresponding preset loss function value.

When the convolutional neural network is trained by using the gradient update method, the values of the network parameters in the convolutional neural network can be adjusted directly, so that each of the first loss function value and the second loss function value is the minimum.

In another optional implementation, any one of the at least one sample image may be clipped and rotated to be upright, and scaled to a preset size before being received by the convolutional neural network.

In still another optional implementation, after any one of the at least one sample image is clipped and rotated to be upright, and scaled to the preset size, the character region template may be obtained in the following manner:

for each kind of character region in two or more sample images that are scaled to the preset size, calculating an average value of locations of respective character regions in the two or more sample images corresponding to the each kind of character region, to obtain average values of locations of all respective character regions in the two or more sample images, where the at least one character region template includes the average values of locations of all respective character regions in the two or more sample images.

The method according to the foregoing embodiments of the present disclosure may be implemented in hardware or firmware, or may be implemented as software or computer code that can be stored in a recording medium (for example, a CD ROM, a RAM, a floppy disk, a hard disk or a magneto-optical disc), or may be implemented as computer code that is downloaded from a network, is stored in a remote recording medium or a non-transitory machine-readable medium originally, and will be stored in a local recording medium. Therefore, the method described herein can be processed by using software that is stored in a recording medium that uses a general-purpose computer, a special-purpose processor or programmable or special-purpose hardware (for example, an ASIC or an FPGA). It may be understood that a computer, a processor, a microprocessor controller or programmable hardware includes a storage component (for example, a RAM, a ROM, or a flash memory) that can store or receive software or computer code. When the software or computer code is accessed and executed by the computer, the processor or the hardware, the processing method described herein is implemented. In addition, when the general-purpose computer accesses code that is used for implementing processing shown herein, execution of the code converts the general-purpose computer to a special-purpose computer configured to execute the processing shown herein.

Figure 7:
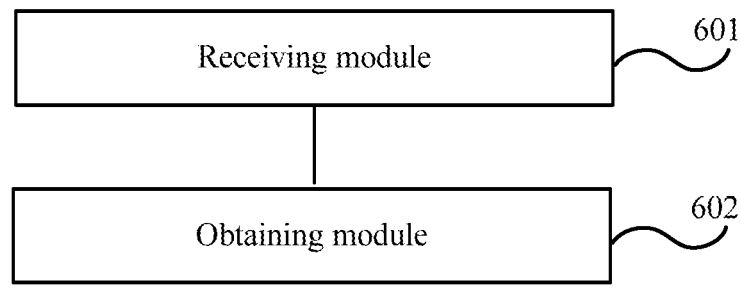
FIG. 7 is a schematic structural diagram of a system for structured text detection according to an embodiment of the present disclosure.

FIG. 7 is a schematic diagram of a system for structured text detection according to an embodiment of the present disclosure. The system for structured text detection in this embodiment can be used to implement the embodiments of the foregoing the method for structured text detection of the present disclosure. As shown in FIG. 7, the system in this embodiment includes a receiving module 601 and an obtaining module 602.

The receiving module 601 is configured to receive an image and at least one character region template. The image includes structured text. The at least one character region template includes a location of at least one character region, and the location of each of the at least one character region is obtained based on a location of a corresponding character region in at least one sample image that is of the same type as the image.

In an optional implementation solution, the location of each character region in the at least one character region template may be determined by a central coordinate, a width, and a length of the each character region.

The obtaining module 602 is configured to obtain actual locations of a group of to-be-detected regions in the image according to the at least one character region template.

In an optional implementation solution, the actual location of each to-be-detected region may be expressed as: $[x+w*f1, y+h*f2, \exp(f3)*w, \exp(f4)*h]$.

$(x+w*f1, y+h*f2)$ represents the central coordinate $(X, Y)$ of the to-be-detected region, $\exp(f3)*w$ represents a length of the to-be-detected region, and $\exp(f4)*h$ represents a width of the to-be-detected region; $x$, $y$, $h$, and $w$ respectively represent X coordinate, Y coordinate, width, and length of the center of a character region corresponding to the to-be-detected region; $[f1, f2, f3, f4]$ respectively represent a regression objective of each character region in the at least one character region template during training of a convolutional neural network, where $[f1, f2, f3, f4] = [(x'-x)/w, (y'-y)/h, \log(w'/w), \log(h'/h)]$, and $x'$, $y'$, $h'$, and $w'$ respectively represent X coordinate, Y coordinate, width, and length of the center of a corresponding character region in each of the at least one sample image.

In an optional implementation solution, in the embodiments of the system for structured text detection in the present disclosure, the receiving module 601 and the obtaining module 602 may be specifically implemented by using the convolutional neural network.

In the system for structured text detection according to this embodiment of the present disclosure, the character region template is pre-obtained based on the locations of the corresponding character regions in the at least one sample image that is of the same type as the image; after receiving the to-be-detected image and the character region template, the convolutional neural network obtains the actual locations of the group of to-be-detected regions in the to-be-detected image according to the character region template. In this way, there is a relatively small number of to-be-detected regions, the amount of computing required for the structured text detection is decreased, less time is consumed, the detection rate is apparently faster, and the computing resources required are reduced apparently.

Figure 8:
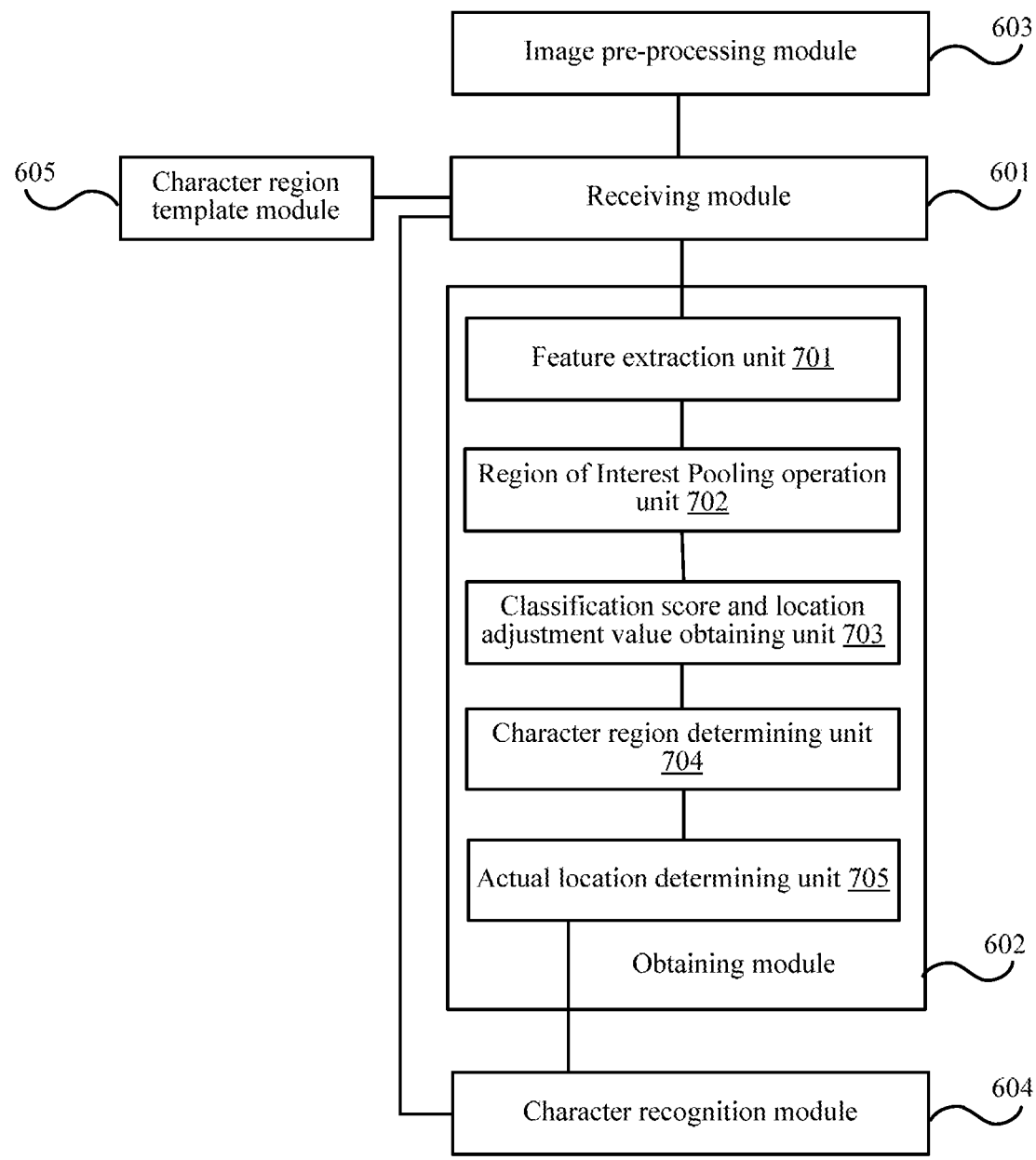
FIG. 8 is a schematic structural diagram of a system for structured text detection according to another embodiment of the present disclosure.

FIG. 8 is a schematic diagram of a system for structured text detection according to another embodiment of the present disclosure. As shown in FIG. 8, compared with the embodiment shown in FIG. 7, in this embodiment, the obtaining module 602 includes: a feature extraction unit 701, an RoI Pooling operation unit 702, a classification score and location adjustment value obtaining unit 703, a character region determining unit 704, and an actual location determining unit 705.

The feature extraction unit 701 is configured to perform convolution processing on the image, to obtain a convolutional feature map of the image.

The RoI Pooling operation unit 702 is configured to: perform an RoI Pooling operation on the convolutional feature map by using locations of all character regions in the character region template as the group of to-be-detected regions in the image, and extract a local feature of each to-be-detected region in the group of to-be-detected regions.

The classification score and location adjustment value obtaining unit 703 is configured to obtain a classification score and a location adjustment value of each to-be-detected region in the group of to-be-detected regions according to the local feature of each to-be-detected region.

The character region determining unit 704 is configured to determine, according to the classification score of each to-be-detected region, whether the to-be-detected region has a character.

In an optional implementation, the character region determining unit 704 may be implemented by using a classification function (softmax) layer. The classification function layer is configured to determine the classification score of each to-be-detected region; and if the classification score of the to-be-detected region is greater than a preset threshold, determine that the to-be-detected region whose classification score is greater than the preset threshold has a character.

The actual location determining unit 705 is configured to adjust, according to the location adjustment value of each to-be-detected region having a character, a coordinate value of the to-be-detected region having a character, to obtain an actual location of the to-be-detected region having a character.

In addition, still referring to FIG. 8, a system for structured text detection according to another embodiment of the present disclosure may selectively include: an image pre-processing module 603, configured to: clip the image, rotate the image to be upright, scale the image to a preset size, and then send the image to the receiving module 601.

In addition, still referring to FIG. 8, a system for structured text detection according to still another embodiment of the present disclosure may selectively include: a character recognition module 604, configured to perform character recognition on regions corresponding to the actual locations of the group of to-be-detected regions, to obtain structured text information in the image.

In addition, still referring to FIG. 8, a system for structured text detection according to yet another embodiment of the present disclosure may selectively include: at least one character region template module 605, configured to: for each kind of character region in the at least one sample image, obtain an average value of correct locations of respective character regions corresponding to the each kind of character region in the at least one sample image that is of the same type as the image, and obtain the at least one character region template according to average values of correct locations of all respective character regions in the at least one sample image.

Figure 9:
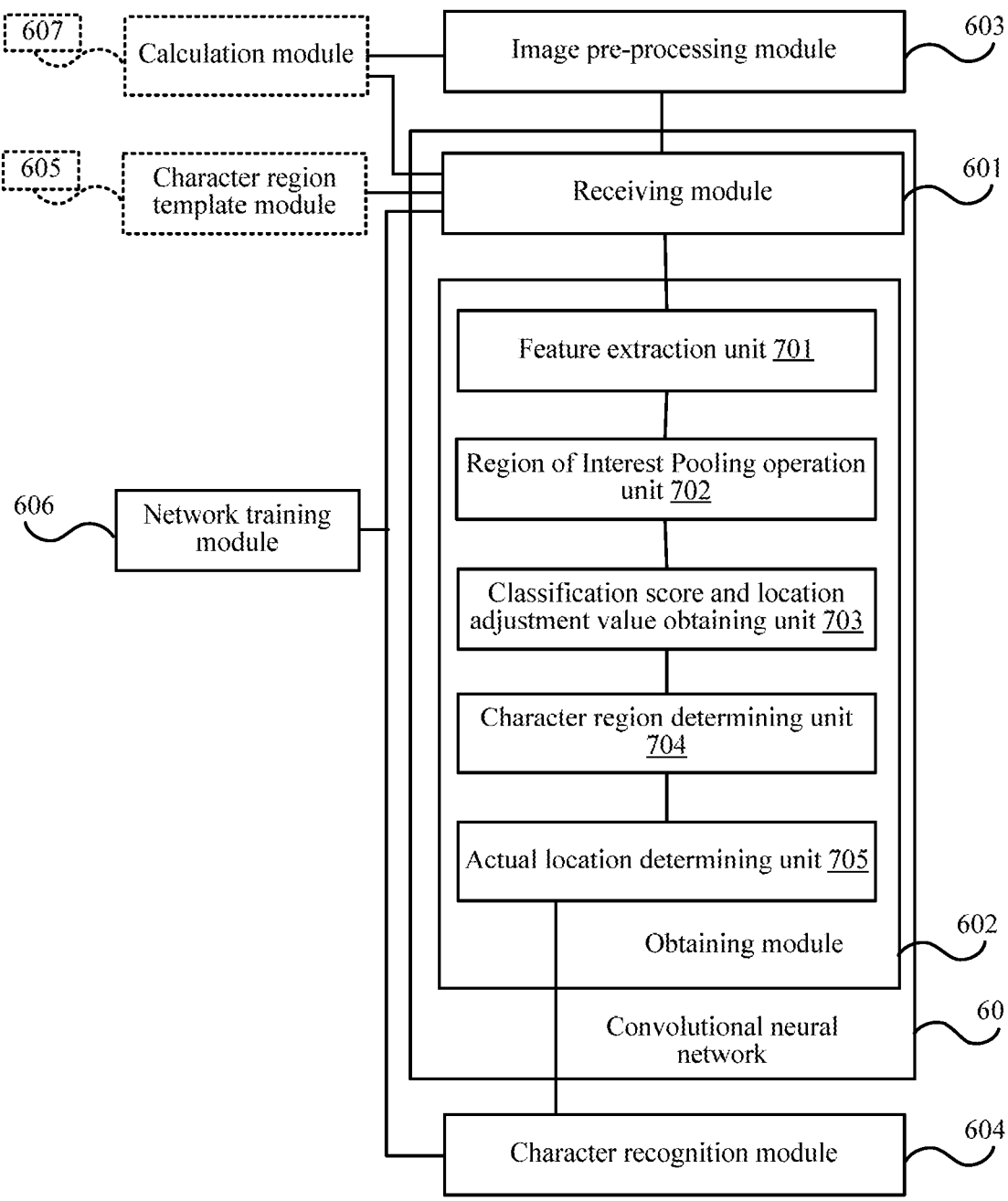
FIG. 9 is a schematic diagram of a system for structured text detection according to still another embodiment of the present disclosure.

FIG. 9 is a schematic diagram of a system for structured text detection according to still another embodiment of the present disclosure. As shown in FIG. 9, when the receiving module 601 and the obtaining module 602 are implemented by using the convolutional neural network 60, the system for structured text detection in the present disclosure may further include a network training module 606, configured to train the convolutional neural network by using the at least one sample image that is of the same type as the image, where each of the at least one sample image includes at least one character region, and each of the at least one sample image is tagged with a correct location of each of the at least one character region.

The network training module 606 may be removed after the training of the convolutional neural network 60 is completed.

In an optional implementation, the convolutional neural network 60 is specifically configured to: receive the at least one sample image and the at least one character region template, and perform the following operations on any one of the at least one sample image: performing convolution processing on the sample image, to obtain a convolutional feature map of the sample image; performing an RoI Pooling operation on the convolutional feature map by using locations of all character regions in the at least one character region template as a group of to-be-detected regions in the sample image, and extracting a local feature of each to-be-detected region in the group of to-be-detected regions; obtaining a prediction classification score and a location adjustment value of each to-be-detected region in the group of to-be-detected regions; determining, according to the prediction classification score of the to-be-detected region, whether the to-be-detected region has a character; and adjusting, according to a location adjustment value of each to-be-detected region having a character, a coordinate value of the each to-be-detected region having a character, to obtain a predicted location of the each to-be-detected region having a character.

Correspondingly, the network training module 606 is specifically configured to train the convolutional neural network 60 according to the correct location of each character region that is tagged in the at least one sample image, a determining result indicating whether each to-be-detected region has a character, and the predicted location.

In addition, in a further embodiment of a system for structured text detection according to the present disclosure, the image pre-processing module 603 is further configured to: clip the image, rotate any one of the at least one sample image to be upright, and scale the sample image to a preset size. Still referring to FIG. 9, the system for structured text detection in this embodiment may further include a calculation module 607, configured to, for each kind of character region in two or more sample images that are scaled to the preset size, calculate an average value of locations of respective character regions in the two or more sample images corresponding to the each kind of character region, to obtain average values of locations of all respective character regions in the two or more sample images, where the at least one character region template includes the average values of locations of all respective character regions in the two or more sample images specifically.

In the embodiments of the system for structured text detection according to the present disclosure, when the at least one character region template is obtained based on the sample image, the at least one character region template may be obtained by calculating the at least one average value of the locations of all character regions in the two or more sample images by using the character region template module 605 or the calculation module 607.

In addition, an embodiment of the present disclosure further provides a computing device, which, for example, may be a mobile terminal, a PC, a tablet computer, or a server. The system for structured text detection according to any one of the embodiments of the present disclosure is disposed in the computing device.

An embodiment of the present disclosure further provides another computing device, including:

a processor and the system for structured text detection according to any one of the embodiments of the present disclosure, where when the system for structured text detection is run by the processor, the units in the system for structured text detection according to any one of the embodiments of the present disclosure are run.

An embodiment of the present disclosure further provides still another computing device, including: a processor, a memory, a communications interface, and a communications bus, where the processor, the memory, and the communications interface communicate with each other by using the communications bus; and the memory is configured to store at least one executable instruction, where the executable instruction causes the processor to perform the operations in each step of the method for structured text detection according to any one of the embodiments of the present disclosure.

Figure 10:
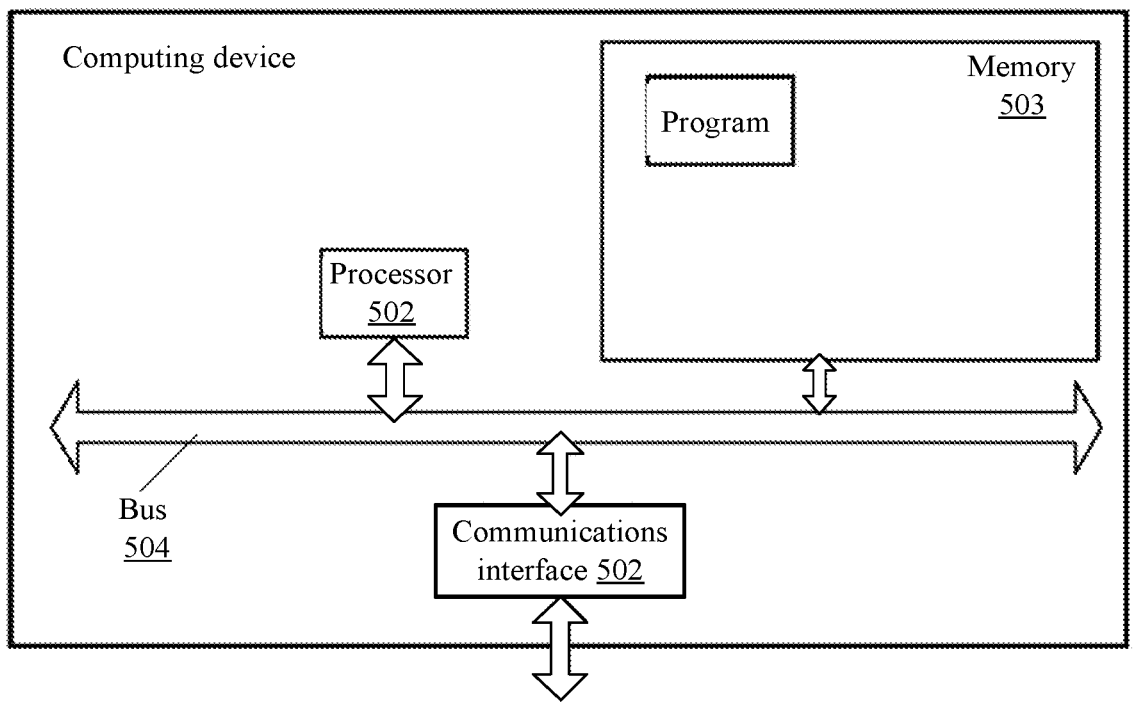
FIG. 10 is a schematic diagram of a computing device for implementing a method for structured text detection according to an embodiment of the present disclosure.

For example, FIG. 10 shows a computing device capable of implementing the method for structured text detection according to the present disclosure. The computing device includes: a processor 801, a communications interface 802, a memory 803, and a communications bus 804.

The processor 801, the communications interface 802, and the memory 803 communicate with each other by using the communications bus 804.

The communications interface 804 is configured to communicate with a network element such as a client or a data collection device.

The processor 801 is configured to execute a program, and may perform relevant steps in the foregoing method embodiments specifically.

The processor 801 may be a CPU or an application-specific integrated circuit (ASIC), or may be configured as one or more integrated circuits for implementing this embodiment of the present disclosure.

The memory 506 is configured to store a program. The program includes at least one executable instruction. The executable instruction may be specifically configured to cause the processor 801 to perform the following operations: receiving, by a convolutional neural network, an image and at least one character region template, where the image includes structured text, the at least one character region template includes a location of at least one character region, and the location of each of the at least one character region is obtained based on a location of a corresponding character region in at least one sample image that is of the same type as the image; and obtaining, by the convolutional neural network, actual locations of a group of to-be-detected regions in the image according to the at least one character region template.

The memory 506 may include a high-speed RAM memory, and may further include a non-volatile memory, for example, at least one magnetic disk memory.

An embodiment of the present disclosure further provides a computer program, including computer-readable code. When the computer-readable code runs in a device, a processor in the device executes instructions for implementing each step of the method for structured text detection according to any one of the embodiments of the present disclosure.

For specific implementations of each step of the computer program in the embodiments of the present disclosure, refer to the descriptions of the corresponding operations, modules, and units in the foregoing embodiments, and details are not described herein again. It may be clearly understood by a person skilled in the art that, for brevity and ease of description, for specific working processes of the foregoing devices and modules, refer to the descriptions of the corresponding processes in the foregoing method embodiments, and details are not described herein again.

An embodiment of the present disclosure further provides a computer system, including:
 a memory, storing executable instructions; and
 one or more processors, communicating with the memory to execute the executable instructions, so as to implement the operations in each step of the method for structured text detection according to any one of the embodiments of the present disclosure.

An embodiment of the present disclosure further provides a non-transitory computer-readable medium, configured to store computer-readable instructions. When the instructions are executed, the operations in each step of the method for structured text detection according to any one of the embodiments of the present disclosure are implemented.

Unless stated explicitly, the singular forms "a" and "the" used herein all include the plural meaning (i.e., mean "at least one"). It should be further understood that, the terms "have", "include" and/or "comprise" used in the specification indicates the existence of a described feature, step, operation, element and/or component, but do not exclude the existence or adding of one or more other features, steps, operations, elements components and/or a combination thereof. The term "and/or" used herein includes any one of or all of the combinations of one or more listed relevant items. Unless stated explicitly, the steps of any method disclosed herein do not need to be performed exactly according to the disclosed sequences.

It should be noted that according to an implementation requirement, each component/step described in the embodiments of the present disclosure may be divided into more components/steps, or two or more components/steps or some operations of components/steps may be combined into a new component/step, to achieve the objective of the embodiments of the present disclosure.

The methods and display provided herein are not related to any particular computer inherently, virtual system, or other devices. Various communications systems may also be used in accordance with the teachings of the present invention. The structure required for constructing such a system is obvious according to the foregoing descriptions. In addition, the present disclosure is not limited to any particular programming language. It should be understood that the content of the present disclosure described herein may be implemented by using various programming languages, and the descriptions of specific languages are provided for disclosing the best implementations of the present disclosure.

In the specification provided herein, a lot of specific details are described. However, it should be understood that the present disclosure can be implemented without these specific details. In some examples, well-known methods, structures and technologies are not shown in detail, so as not to obscure the understanding of the specification.

Similarly, it should be understood that to simplify the present disclosure and help understand one or more of various inventive aspects, in the foregoing descriptions of the exemplary embodiments of the present disclosure, various features of the present disclosure are sometimes grouped together in a single embodiment, figure, or description thereof. This method of present disclosure, however, is not to be interpreted as reflecting an intention that the claimed invention requires more features than are recited in each claim expressly. Rather, to be more accurate, as the following claims reflect, inventive aspects lie in less than all features of a single foregoing disclosed embodiment. Therefore, the claims complying with the specific implementations are merged into the specific implementations explicitly, and each claim serves as a single embodiment of the present disclosure.

The embodiments in the specification are all described in a progressive manner, for same or similar parts in the embodiments, refer to these embodiments, and each embodiment focuses on a difference from other embodiments. The system, device, storage medium, and program embodiments correspond to the method embodiments substantially and therefore are only described briefly, and for the associated part, refer to the descriptions of the method embodiments.

Some embodiments are described above. However, it should be noted that the present disclosure is not limited to these embodiments, but may be implemented in others manners that fall within the scope of the subject of the present disclosure.

A person of ordinary skill in the art may be aware that, in combination with the examples described in the embodiments disclosed in the specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that this implementation goes beyond the scope of the embodiments of the present disclosure.

The foregoing implementations are merely intended to describe the embodiments of the present disclosure rather than limit the embodiments of the present disclosure. A person of ordinary skill in the art may make modifications and variations without departing from the spirit and scope of the embodiments of the present disclosure. Therefore, all equivalent technical solutions shall also fall within the scope of the embodiments of the present disclosure, and the patent protection scope of the embodiments of the present disclosure shall be subject to the claims.

The invention claimed is:

1. A method for structured text detection, comprising:
receiving, by a convolutional neural network, a to-be-detected image and at least one character region template, wherein the to-be-detected image comprises structured text, the at least one character region template comprises a location of each of N first character regions with N being an integer equal to or greater than 1, and the location of the each first character region is obtained based on locations of second character regions in M sample images that are of the same type as the to-be-detected image, wherein the second character regions correspond to the each first character region, and M is an integer equal to or greater than 1; and
obtaining, by the convolutional neural network, an actual location of the structured text in the to-be-detected image according to the at least one character region template,
wherein the obtaining, by the convolutional neural network, the actual location of the structured text in the to-be-detected image according to the at least one character region template comprises:
determining at least one to-be-detected region of the to-be-detected image based on a location of at least one first character region in the character region template;
determining a to-be-detected region containing a character among the at least one to-be-detected region and determining a location adjustment value of the to-be-detected region containing a character; and
adjusting coordinates of the to-be-detected region containing a character based on the location adjustment value of the to-be-detected region containing a character, to obtain an actual location of the to-be-detected region containing a character.

2. The method for structured text detection according to claim 1, wherein the determining the at least one to-be-detected region of the to-be-detected image based on the location of the at least one first character region in the character region template comprises:
taking each of the N first character regions of the character region template as the to-be-detected region of the to-be-detected image.

3. The method for structured text detection according to claim 1, wherein the determining the to-be-detected region containing a character from among the at least one to-be-detected region and determining the location adjustment value of the to-be-detected region containing a character comprises:
obtaining a classification score and a location adjustment value of each to-be-detected region of the at least one to-be-detected region according to a local feature of the each to-be-detected region of the at least one to-be-detected region; and
determining, according to the classification score of the each to-be-detected region of the at least one to-be-detected region, whether the each to-be-detected region has a character.

4. The method according to claim 3, further comprising:
performing convolution processing on the to-be-detected image to obtain a convolutional feature map of the to-be-detected image;
performing a Region of Interest (RoI) Pooling operation on the convolutional feature map, and extracting the local feature of each to-be-detected region of the at least one to-be-detected region.

5. The method according to claim 3, wherein the determining, according to the classification score of the each to-be-detected region of the at least one to-be-detected region, whether the each to-be-detected region has a character comprises:
determining, a to-be-detected region of the at least one to-be-detected region, which has a classification score greater than a preset threshold, as the to-be-detected region containing a character.

6. The method according to claim 1, wherein the location of each first character region in the at least one character region template comprises a central coordinate, a width and a length of the each first character region.

7. The method according to claim 1, further comprising:
prior to the receiving, by the convolutional neural network, the to-be-detected image and the at least one character region template,
clipping the to-be-detected image, rotating the to-be-detected image to be upright, and scaling the to-be-detected image to a preset size.

8. The method according to claim 1, further comprising:
after the obtaining the actual location of the structured text in the image,
performing character recognition on a region corresponding to the actual location of the structured text, to obtain structured text information in the to-be-detected image.

9. The method according to claim 1, further comprising:
prior to the receiving, by the convolutional neural network, the to-be-detected image and the at least one character region template,
obtaining an actual location of a second character region corresponding to each first character region in each of the M sample images; and
obtaining the at least one character region template based on an average value of actual locations of the second character regions corresponding to the each first character region in the M sample images.

10. The method according to claim 1, further comprising: prior to the receiving, by the convolutional neural network, the to-be-detected image and the at least one character region template,
   training the convolutional neural network by using at least one sample image that is of the same type as the to-be-detected image, wherein each of the at least one sample image is tagged with an actual location of at least one second character region of the each sample image.

11. An electronic device, comprising:
a memory storing processor-executable instructions; and
a processor arranged to execute the stored processor-executable instructions to perform steps of:
receiving, by a convolutional neural network, a to-be-detected image and at least one character region template, wherein the to-be-detected image comprises structured text, the at least one character region template comprises a location of each of N first character regions with N being an integer equal to or greater than 1, and the location of the each first character region is obtained based on locations of second character regions in M sample images that are of the same type as the to-be-detected image, wherein the second character regions correspond to the each first character region, and M is an integer equal to or greater than 1; and
obtaining, by the convolutional neural network, an actual location of the structured text in the to-be-detected image according to the at least one character region template,
wherein the obtaining, by the convolutional neural network, the actual location of the structured text in the to-be-detected image according to the at least one character region template comprises:
determining at least one to-be-detected region of the to-be-detected image based on a location of at least one first character region in the character region template;
determining a to-be-detected region containing a character from among the at least one to-be-detected region and determining a location adjustment value of the to-be-detected region containing a character; and
adjusting coordinates of the to-be-detected region containing a character based on the location adjustment value of the to-be-detected region containing a character, to obtain an actual location of the to-be-detected region containing a character.

12. The electronic device according to claim 11, wherein the location of each first character region in the at least one character region template comprises a central coordinate, a width and a length of the each first character region.

13. The electronic device according to claim 11, wherein the determining the at least one to-be-detected region of the to-be-detected image based on the location of the at least one first character region in the character region template comprises:
   taking each of the N first character regions of the character region template as the to-be-detected region of the to-be-detected image.

14. The electronic device according to claim 11, wherein the determining the to-be-detected region containing a character from among the at least one to-be-detected region and determining the location adjustment value of the to-be-detected region containing a character comprises:
   obtaining a classification score and a location adjustment value of each to-be-detected region of the at least one to-be-detected region according to a local feature of the each to-be-detected region of the at least one to-be-detected region; and
   determining, according to the classification score of the each to-be-detected region of the at least one to-be-detected region, whether the each to-be-detected region has a character.

15. The electronic device according to claim 14, wherein the processor is arranged to execute the stored processor-executable instructions to further perform:
   performing convolution processing on the to-be-detected image to obtain a convolutional feature map of the to-be-detected image;
   performing a Region of Interest (RoI) Pooling operation on the convolutional feature map, and extract the local feature of each to-be-detected region of the at least one to-be-detected regions.

16. The electronic device according to claim 14, wherein the determining, according to the classification score of the each to-be-detected region of the at least one to-be-detected region, whether the each to-be-detected region has a character comprises:
   determining, a to-be-detected region of the at least one to-be-detected region, which has a classification score greater than a preset threshold, as the to-be-detected region containing a character.

17. The electronic device according to claim 11, wherein the processor is arranged to execute the stored processor-executable instructions to further perform at least one of the following steps:
   prior to the receiving, by the convolutional neural network, the to-be-detected image and the at least one character region template, clipping the to-be-detected image, rotating the to-be-detected image to be upright, and scaling the to-be-detected image to a preset size; or
   after obtaining the actual location of the structured text in the image, performing character recognition on regions corresponding to the actual locations of the structured text, to obtain structured text information in the to-be-detected image.

18. The electronic device according to claim 11, wherein the processor is arranged to execute the stored processor-executable instructions to further perform a step of: prior to the receiving, by the convolutional neural network, the to-be-detected image and the at least one character region template,
   obtaining an actual location of a second character region corresponding to each first character region in each of the M sample images, and obtaining the at least one character region template based on an average value of actual locations of the second character regions corresponding to the each first character region in the M sample images; or
   training the convolutional neural network by using at least one sample image that is of the same type as the to-be-detected image, wherein each of the at least one sample image is tagged with an actual location of at least one second character region of the each sample image.

19. A non-transitory computer-readable medium having stored thereon computer-readable instructions that, when executed by a processor, cause the processor to execute a method for structured text detection, the method comprising:
   receiving, by a convolutional neural network, a to-be-detected image and at least one character region template, wherein the to-be-detected image comprises structured text, the at least one character region template comprises a location of each of N first character regions with N being an integer equal to or greater than 1, and the location of the each first character region is obtained based on locations of second character regions in M sample images that are of the same type as the to-be-detected image, wherein the second character regions correspond to the each first character region, and M is an integer equal to or greater than 1; and obtaining, by the convolutional neural network, an actual location of the structured text in the to-be-detected image according to the at least one character region template, wherein the obtaining, by the convolutional neural network, the actual location of the structured text in the to-be-detected image according to the at least one character region template comprises:

determining at least one to-be-detected region of the to-be-detected image based on a location of at least one first character region in the character region template;

determining a to-be-detected region containing a character from among the at least one to-be-detected region and determining a location adjustment value of the to-be-detected region containing a character; and adjusting coordinates of the to-be-detected region containing a character based on the location adjustment value of the to-be-detected region containing a character, to obtain an actual location of the to-be-detected region containing a character.

\* \* \* \* \*